United States Patent Office 2,924,567
Patented Feb. 9, 1960

2,924,567

**REFINING PETROLEUM WAX BY CONTACT FIL-
TRATION UTILIZING A CRYSTALLINE ZEOLITE
MOLECULAR SIEVE**

Clinton H. Holder and Harold A. Ricards, Westfield, N.J.,
assignors to Esso Research and Engineering Company,
a corporation of Delaware No Drawing. Application December 28, 1956
Serial No. 631,068

8 Claims. (Cl. 208—26)

This invention is concerned with improvements in the manufacture of high quality petroleum waxes and particularly with the production of waxes of superior quality with respect to color, odor, and stability. These improvements are effected by subjecting the waxes to contact filtration with certain materials known as molecular sieves.

Paraffin wax has long been one of the most important products derived from petroleum. It finds wide application in the manufacture of such products as candles, sealing materials and water-proofing compositions and in the food industry for coating of milk cartons and for the coating of paper, etc. for packaging. In many instances the color and odor of a wax constitute its most important properties, particularly when the wax is to be used in conjunction with pharmaceutical or food products. Specifications for food packaging require that paraffin waxes be essentially colorless, odorless and tasteless. In addition, to be considered suitable for use in conjunction with foods, drugs and cosmetics, the wax must generally meet a test for reactive substances. (U.S.P. acid test). When it is realized that upwards of 80 to 85 percent of the total annual consumption of paraffin wax in the United States is used in the food and related industries, the importance of manufacturing paraffin waxes that will meet color and odor specifications is evident.

Undesirable color and odor are generally the result of small amounts of impurities present in the wax. These impurities may include certain oxygenated compounds as well as aromatic and naphthenic materials. Some of these impurities may be present as residual oil and others as solid components. Proper refining techniques are necessary for removal of those impurities and it is with improvements in such techniques that the present invention is concerned.

For a proper understanding of the present invention, a brief description of the processes employed in wax manufacture will be helpful. Paraffin waxes are found primarily in paraffinic crude oils and mixed base crude oils and are concentrated in distillate fractions of around 650 to 900° F. boiling range. Some wax is also found in higher boiling distillate fractions and residuum and is frequently recovered and refined. This wax has a smaller crystal size and has a wider range of composition types. It is commonly defined as microcrystalline wax, or more briefly, as microwax.

To remove these waxes from the petroleum fractions in which they occur, the general technique involves reducing the solubility of the wax in the oil. This is essentially done by chilling the oil to a low temperature and removing the wax by filtration. A solvent such as propane or methyl ethyl ketone is generally employed to aid in the separation by reducing the oil viscosity to facilitate filtration and modifying the wax crystal structure to improve the filtration efficiency.

Once the wax has been removed from the oil, it then becomes necessary to reduce the oil content of the wax, subject it to purifying steps for removal of reactive components and for improvement of color and odor, and segregate the purified wax into various melting point grades. The exact manner in which a wax is refined will depend upon the type of wax being processed and the equipment that is available. Crystalline paraffin waxes are normally de-oiled by one of two methods, either by sweating or by solvent de-oiling. Sweating involves cooling the slack wax that has been obtained from the dewaxing operation and then gradually raising the temperature of the wax cake until the oil and very low melting point waxes are removed from the wax cake. The wax from this operation is known as scale wax and generally contains about 1 to 6 percent of oil. By subjecting the scale wax to further sweating, wax fractions of the required melting point grades can be obtained having oil contents in the range of 0.1 to 0.5 percent.

Solvent de-oiling can be accomplished by one of two methods. The wax can be completely dissolved in from 4 to 14 volumes of a solvent such as propane or methyl ethyl ketone and at a temperature from 20° F. to 70° F. above the dewaxing temperature. The solution is then cooled and the wax re-crystallized and filtered from the solvent. Alternatively, the chilled solvent-containing wax cake from the dewaxing operation can be "repuddled" or agitated into a slurry with a lesser amount of cold solvent and then refiltered.

The deoiled waxes are then chemically treated, usually with sulfuric acid, to remove reactive substances. This procedure is necessary to insure high purity waxes for the food and drug industry. Mild hydrogenation of wax at about 600° F. and 200 p.s.i.g. can be employed in place of sulfuric acid treating.

After a wax has been de-oiled and chemically treated, two major refining steps remain: (1) separation into the desired melting point grades, and (2) processing to a suitable odor and color. It is these finishing operations with which this invention is primarily concerned.

The usual method that is employed for decolorizing and deodorizing wax is to percolate the molten wax through a bed of an adsorbent material at temperatures sufficiently high to keep the wax in a liquid state. This adsorption step may also be accomplished by contact filtration, in which procedure the wax is mixed with an adsorbent and the mixture is filtered in a conventional manner. Normally an activated clay is employed as an adsorbent and such adsorbents as Attapulgus fines which comprise a natural earth clay, and Super Filtrol, which is an acid-activated bentonite clay, are employed for decolorization of wax as well as for the removal of reactive materials.

When employing the percolation procedure, the rate is generally about ½ to 2 tons of wax per ton of adsorbent per hour and the operating temperature is usually in the range of 150° F. to 200° F. Somewhat higher temperatures, e.g. up to 450° F. are employed with contact filtration. Preferably temperatures of 300° to 400° F. and contact times of from 5 minutes to about one hour are employed in the latter type of treatment. Thus the temperature employed in practicing this invention will range from about 150° F. to about 450° F.

The yield of wax obtained per volume of adsorbent employed will depend upon the color of the feed and the desired color of the products obtained. The paraffin waxes generally are decolorized to a color shade of +30 as determined by the Saybolt chromometer. Where the feed to the decolorizing operation has a —2 Saybolt color, a yield of about 25 tons of wax per ton of adsorbent can be expected. Where the feed has a color rating of about +20 Saybolt, a yield of about 60 tons of decolorized wax per ton of adsorbent is about normal. When using the contact filtration procedure from about 5 percent to about 30 percent of adsorbent is employed, based on the weight of wax.

The Saybolt method for determining color is a standard test in the petroleum industry and description of the method can be found in the "Tag Manual for Inspectors of Petroleum," published by C. J. Tagliabue Manufacturing Company.

The odor of the wax is measured by a group of several specially trained people all of whom rate the odor of fresh shavings of the wax at the same time. The nose is virtually submerged in the shavings and the odor is assigned a number on a scale running from 0 to 9, zero on the scale indicating lack of odor and 9 having the strongest odor.

It is an object of the present invention to provide improvements in the art of finishing paraffin and microcrystalline waxes by either percolation or contact filtration. In accordance with the present invention, it has been found that materials known as molecular sieves are superior to the usual adsorbents that are employed in this step of paraffin wax refining.

Certain natural zeolites, as for example analcites and chabasites, have crystal patterns that are such that they present structures containing a large number of pores that are exceptionally uniform in size. Because of this, these zeolites have the property of preferentially adsorbing compounds of one molecular configuration from those of other molecular configurations. Only molecules that are small enough to enter the pores can be adsorbed. The pores in different zeolites may vary in diameter from less than 4 or 5 to 15 or more Angstrom units, but for any one zeolite the pores are substantially of uniform size. Because of these properties, such zeolites are known as molecular sieves. Certain synthetic zeolites also have molecular sieve properties as taught, for example, by Barrer in U.S. Patent 2,306,610 and by Black in U.S. Patent 2,442,191.

In practicing the present invention, molecular sieves of from 10 to 15 Angstrom size are preferred. For example, a 13 Angstrom sieve may be effectively employed. Such a sieve may be prepared by reaction of a sodium silicate having a high ratio of sodium-to-silica, e.g. sodium metalsilicate, with a sodium aluminate having a soda-to-alumina ratio of from 1:1 to 3:1, the proportion of sodium silicate solution to sodium aluminate solution being such that the ratio of silica-to-alumina in the final mixture is at least 3:1 and preferably from about 4:1 to about 10:1. Preferably the sodium aluminate solution is added to the sodium metasilicate solution at ambient temperatures while employing rapid and efficient agitation so as to ensure the formation of a precipitate having an essentially uniform composition throughout. The resulting homogeneous paste is heated to about 180 to 215° F. for a period as long as 200 hours or more to ensure that the crystals thereby formed will have the desired pore size of about 13 Angstroms. After the period of heat soaking, a precipitated sodium alumino silicate is filtered and water washed and then dried and activated in a calcining zone preferably at a temperature of about 700 to 900° F.

The following examples will serve to illustrate the advantages of the present invention. The paraffin wax employed for the tests described in these examples had been obtained by dewaxing of extracted lube stocks. It was then de-oiled by sweating and acid treated. Thus it is typical of the feed to a bauxite decolorization process in a commercial plant. The molecular sieve material employed in these tests was a sodium alumino silicate material having a pore size of 13 Angstroms.

EXAMPLE 1

Separate samples of the paraffin wax described above were contacted as an agitated slurry with each of three different adsorbents at temperatures of 300° F. and contact times of 30 minutes and then filtered. The adsorbents employed were Attapulgus fines, Super Filtrol and powdered 13 Angstrom molecular sieve material. In one set of tests the quantity of the adsorbent amounted to about 5 weight percent of the paraffin wax and in another set of tests the quantity employed was about 20 weight percent of the paraffin wax. The finished products were inspected for melting point, color, odor and U.S.P. acid test. The results obtained are presented in Table I.

*Table I*

CONTACT FILTRATION OF PARAFFIN WAX AT 390° F.

(Contact time 30 minutes)

| Adsorbent | | Attapulgus Fines | | Super Filtrol | | 13 A. Molecular Sieve Powder | |
|---|---|---|---|---|---|---|---|
| Wt. Percent of Adsorbent | | 5 | 20 | 5 | 20 | 5 | 20 |
| Properties of Finished Product: | Feed | | | | | | |
| Melting Pt., ° F | 132 | 132 | 132.5 | 132 | 132 | 132 | 132 |
| Color, Saybolt | +9 | +27 | +30 | +30 | +30 | +27 | +30 |
| Odor [1] | 9 | 8 | 7 | 5 | 7 | 4 | 2 |
| U.S.P. Acid Test [2] | Above 20 | 10 | 1 | 3 | 0 to 1 | 0 to 1 | 0 to 1 |

[1] Zero scale is no odor. Six scale is moderate to strong odor, nine scale is very strong odor.
[2] A rating of 5 or lower is satisfactory. ASTM D-612.

It will be seen from the data that the molecular sieve material was superior to either of the other adsorbents both in reducing the odor rating of the wax and in enabling the wax to meet the U.S.P. acid test.

EXAMPLE 2

In the same manner as in Example 1, separate samples of the paraffin wax were contacted with each of the separate adsorbents at a temperature of 400° F. rather than the 300° F. of Example 1. Additionally, silica gel was tested as an adsorbent. The same inspections were made on the finished products as in Example 1. The data obtained are presented in Table II.

Table II
CONTACT FILTRATION OF PARAFFIN WAX AT 490° F.
(Contact time 30 minutes)

| Adsorbent | | Attapulgus Fines | Silica Gel | Super Filtrol | 13 A. Molecular Sieve Powder |
|---|---|---|---|---|---|
| Wt. Percent of Adsorbent | | 20 | 20 | 20 | 20 |
| Properties of Finished Product: | Feed | | | | |
| Melting Pt., °F | 132 | 132 | 132 | 132 | 132 |
| Color, Saybolt | +9 | +30 | +24 | +30 | +30 |
| Odor | 9 | 4 | 4 | 7 | 0 to 1 |
| U.S.P. Acid Test | Above 20 | 0 to 1 | 2 | 8 | 0 to 1 |

It will be seen from the above data that the molecular sieve material was even more effective at 400° F. than at 300° F. There was little or no improvement at the higher temperature for the other adsorbents as compared to the filtration at the lower temperature.

It has also been shown that molecular sieves may be used for wax quality improvement employing the percolation procedure, which, as mentioned earlier, is conducted at lower temperatures. The percolation procedure is less effective than the higher temperature slurry contacts, however.

As would be expected the molecular sieves are much less potent for improving the wax quality after one treatment such as in Example 1 or 2. Washing with solvents such as hexane, secondary butyl acetate, a mixture of methyl ethyl ketone and toluene, or other solvents, may restore activity somewhat, but it is preferred to regenerate the sieve materials by a controlled burning operation. For example the materials may be heated under mild oxidation conditions at temperatures of about 700 to 800° F. for periods of up to several hours.

EXAMPLE 3

In the same manner as in Example 1 a sample of paraffin wax was contacted as an agitated slurry with 5 percent of its weight of 13 Angstrom molecular sieve material at 300° F. and 30 minutes contact time and then filtered. A quantity of recovered sieve material was washed with hexane and employed for treating an additional quantity of the wax in the same manner. Another portion of recovered sieve material was subjected to mild oxidation conditions at temperatures of 750–800° F. for a number of hours and then employed for treating wax, again in the same manner as above. The data obtained on inspection of each of the treated waxes are presented in Table III.

Table III
COMPARISON OF FRESH AND USED SIEVES IN CONTACT FILTRATION OF PARAFFIN WAX AT 300° F.
(Contact time, 30 minutes—5 weight percent of adsorbent)

| Adsorbent | | Fresh Sieve | Used Sieve After Solvent Treatment | Used Sieve After Burning Treatment |
|---|---|---|---|---|
| Percent Carbon on Sieve Before Use | | 0.07 | 6.0 | 0.05 |
| Inspections on Finished Product: | Feed | | | |
| Odor | >9 | 3 | 7 | 4 |
| Color, Saybolt | +9 | +30 | +22 | +26 |
| U.S.P. Acid Test | >20 | 1 | 12 | 5 |

It will be seen from the data of Table III that although solvent treatment of the molecular sieve material restored its activity somewhat, regeneration by air burning was considerably more effective.

Another benefit derived from the molecular sieve treatment of wax is that of reducing its oil content. Thus, a preferred refining process for wax involves solvent de-oiling by conventional procedures to an economically low level, e.g. below 1 percent, and in the range of 0.2 to 0.6 percent, followed by more exhaustive de-oiling to less than 0.2 percent by treatment with molecular sieves. The following example is illustrative of this.

EXAMPLE 4

A paraffin wax that had been de-oiled to an oil content of 0.57 percent was subjected to contact filtration in the manner employed in Examples 1 and 2, using 5 weight percent of 13 Angstrom molecular sieves, temperatures of 300° F. and 400° F. and contact times of 30 minutes. Inspections of the treated waxes are presented in Table IV.

Table IV
DE-OILING OF WAX WITH MOLECULAR SIEVES
(Contact time, 30 minutes)

| | Semi-Refined Wax | 300° F. Treatment | 400° F. Treatment |
|---|---|---|---|
| Wax Inspections: | | | |
| Color, Saybolt | +9 | +30 | +30 |
| Odor | >9 | 3 | 1 |
| U.S.P. Acid Test | >20 | 1 | 1 |
| Percent Oil | 0.57 | 0.07 | 0.02 |

It is to be understood that the foregoing examples are presented merely to illustrate the invention and that it is not intended that the invention be limited thereby. While the examples are directed to treatment of paraffin wax it is to be understood, as previously noted, that the invention is also applicable to the finishing of microcrystalline waxes.

The scope of this invention is to be limited only by the claims appended hereto.

What is claimed is:

1. In the refining of a petroleum wax the improvement which comprises contacting the wax with an adsorbent comprising a crystalline zeolite molecular sieve having a pore size of from about 10 to 15 Angstroms so as to improve its odor.

2. Process as defined by claim 1 in which the molecular sieve material is a synthetic metal alumino silicate having a pore size of about 13 A.

3. Process as defined by claim 1 in which the contacting is effected at temperatures of from 150° F. to 450° F.

4. Process as defined by claim 1 in which the contacting is effected by admixing the wax with the adsorbent at temperatures of from about 300 to 400° F. for from about 5 minutes to about 1 hour.

5. Process as defined by claim 1 wherein said wax comprises paraffin wax.

6. Process as defined by claim 1 wherein said wax is a microcrystalline wax.

7. Process as defined by claim 1 wherein the molecular sieve material comprises sieve material that has previously been employed for contacting wax and that has been regenerated by heating under mild oxidation conditions at temperatures of 700 to 800° F.

8. In the refining of a petroleum wax the improvement which includes the step of solvent de-oiling the wax to less than 1 percent oil content followed by the step of contacting the wax at temperatures of from 150° F. to 450° F. with a crystalline zeolite molecular sieve having a pore size of from about 10 to 15 Angstroms, whereby the oil content is reduced to less than 0.2 percent.

References Cited in the file of this patent

UNITED STATES PATENTS

| | | |
|---|---|---|
| 2,306,610 | Barrer | Dec. 29, 1942 |
| 2,442,191 | Black | May 25, 1948 |
| 2,522,426 | Black | Sept. 12, 1950 |
| 2,574,434 | Greentree et al. | Nov. 6, 1951 |
| 2,723,220 | Axe | Nov. 8, 1955 |
| 2,834,429 | Kinsella et al. | May 13, 1958 |

OTHER REFERENCES

Barrer: Soc. of Chem. Ind. J., vol. 64, pp. 130–133, May 1945.

Breck et al.: Jour. Amer. Chem. Soc., vol. 78, No. 23, pp. 5963–5971, Dec. 5, 1956.